(12) United States Patent
Kwalk

(10) Patent No.: US 7,560,516 B2
(45) Date of Patent: Jul. 14, 2009

(54) POLYETHYLENE COMPOSITIONS HAVING IMPROVED TEAR PROPERTIES

(75) Inventor: Tae Hoon Kwalk, Belle Mead, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 11/900,863

(22) Filed: Sep. 13, 2007

(65) Prior Publication Data

US 2008/0045647 A1 Feb. 21, 2008

Related U.S. Application Data

(62) Division of application No. 10/745,461, filed on Dec. 22, 2003, now Pat. No. 7,288,596.

(51) Int. Cl.
C08L 23/00 (2006.01)
C08L 23/04 (2006.01)
C08L 23/08 (2006.01)

(52) U.S. Cl. ..................... 525/191; 525/240

(58) Field of Classification Search ........... 525/191, 525/240
See application file for complete search history.

(56) References Cited

U.S. PATENT DOCUMENTS

| | | | | |
|---|---|---|---|---|
| 4,336,352 | A | 6/1982 | Sakurai et al. | 525/240 |
| 5,091,228 | A | 2/1992 | Fujii et al. | 428/34.3 |
| 5,110,685 | A | 5/1992 | Cross et al. | 428/494 |
| 5,208,309 | A | 5/1993 | McDaniel et al. | 526/348.2 |
| 5,274,056 | A | 12/1993 | McDaniel et al. | 526/106 |
| 5,338,589 | A | 8/1994 | Böhm et al. | 428/36.9 |
| 5,344,884 | A | 9/1994 | Benham et al. | 525/222 |
| 5,378,764 | A | 1/1995 | Benham et al. | 525/240 |
| 5,494,965 | A | 2/1996 | Harlin et al. | 525/52 |
| 5,635,262 | A | 6/1997 | Best et al. | 428/36.92 |
| 5,739,225 | A | 4/1998 | Tazaki et al. | 526/127 |
| 5,795,941 | A | 8/1998 | Cree et al. | 525/240 |
| 6,090,893 | A | 7/2000 | Harlin et al. | 525/240 |
| 6,185,349 | B1 * | 2/2001 | Dammert et al. | 385/100 |
| 6,218,472 | B1 | 4/2001 | Debras et al. | 525/191 |
| 6,340,730 | B1 | 1/2002 | Murray et al. | 526/114 |
| 6,344,522 | B1 | 2/2002 | Promel | 525/242 |
| 6,359,072 | B1 | 3/2002 | Whaley | 525/191 |
| 6,388,017 | B1 | 5/2002 | McDaniel et al. | 525/240 |
| 6,388,115 | B1 | 5/2002 | Crowther et al. | 556/11 |
| 6,403,717 | B1 | 6/2002 | Adams et al. | 525/191 |
| 6,420,580 | B1 | 7/2002 | Holtcamp et al. | 556/11 |
| 6,433,095 | B1 | 8/2002 | Laurent | 525/240 |
| 6,441,096 | B1 | 8/2002 | Backman et al. | 525/240 |
| 6,476,166 | B1 | 11/2002 | Holtcamp et al. | 526/160 |
| 6,479,589 | B2 * | 11/2002 | Debras et al. | 525/191 |
| 6,489,427 | B1 | 12/2002 | Clutton et al. | 526/352 |
| 6,525,148 | B1 | 2/2003 | McDaniel et al. | 526/111 |
| 6,534,604 | B2 | 3/2003 | Loveday et al. | 526/113 |
| 6,562,905 | B1 | 5/2003 | Nummila-Pakarinen et al. | 525/191 |
| 6,566,450 | B2 | 5/2003 | Debras et al. | 525/191 |
| 6,569,948 | B2 | 5/2003 | Laurent | 525/240 |
| 6,605,675 | B2 | 8/2003 | Mawson et al. | 526/115 |
| 6,608,149 | B2 | 8/2003 | Mawson et al. | 526/60 |
| 6,613,841 | B2 | 9/2003 | Williams | 525/191 |
| 6,624,266 | B2 | 9/2003 | Terry et al. | 526/160 |
| 6,713,561 | B1 * | 3/2004 | Berthold et al. | 525/191 |
| 7,288,596 | B2 * | 10/2007 | Kwalk | 525/191 |
| 2003/0144426 | A1 | 7/2003 | Williams | 525/270 |

FOREIGN PATENT DOCUMENTS

| | | |
|---|---|---|
| WO | 94/22948 | 10/1994 |
| WO | 97/47682 | 12/1997 |
| WO | 00/37511 | 6/2000 |

OTHER PUBLICATIONS

Debra J. Houska and Steve A. Best, "*Blends of mLLDPE with MMW-HDPE for Films with Improved Property Stiffness Balance*" 1997 Polymers, Laminations, & Coatings Conference p. 633-638 (1997).

* cited by examiner

Primary Examiner—Nathan M Nutter
(74) Attorney, Agent, or Firm—Leandro Arechederra, III; Kevin M. Faulkner

(57) ABSTRACT

Disclosed are various compositions, including but not limited to a high density multimodal polyethylene composition, that has a density of 0.935 g/cc or more, and that includes a blend of a first polyethylene component and a second polyethylene component, in which: the first polyethylene component includes a bimodal polyethylene; and the second polyethylene component includes a unimodal polyethylene that is made from a polymerization conducted in the presence of a metallocene having two cyclopentadienyl rings.

6 Claims, No Drawings

POLYETHYLENE COMPOSITIONS HAVING IMPROVED TEAR PROPERTIES

CROSS REFERENCE TO RELATED APPLICATIONS

This application is a divisional application of Ser. No. 10/745,461, filed Dec. 22, 2003, now allowed, the disclosure of which is incorporated by reference in its entirety.

BACKGROUND

1. Field of Inventions

Embodiments of the present inventions generally relate to compositions containing polyethylene.

2. Description of Related Art

Although bimodal polyethylene compositions have numerous advantages, and have solved various problems in the art, an ongoing need exists for further improvements, particularly in films and polyethylene compositions used to make films. Some of the properties used to characterize films are Elmendorf Tear (MD and TD) values, which are properties based on the procedures set forth in ASTM D 1922. The MD Elmendorf Tear value refers to tear resistance properties in the "machine direction" while the TD Elmendorf Tear value refers to tear resistance properties in the "transverse direction." It is generally desirable to balance the two values. A film that has a highly unbalanced TD/MD ratio, e.g., over 10, is often found to be splitty, and to experience zippering when subjected to tear. At least some of the compositions described herein have improved "tear balance," a term that refers to the TD/MD ratio of a film made from that particular composition. As discussed herein, a composition with a better tear balance is one that can be formed into a film with a lower TD/MD ratio (closer to unity or 1) than a composition with a worse tear balance, such that a film made of the latter composition has a higher, and less desirable, TD/MD ratio.

Certain patents that refer to polyethylene compositions, and methods for making polyethylene, include the following: U.S. Pat. Nos. 4,336,352; 5,091,228; 5,110,685; 5,208,309; 5,274,056; 5,635,262; 5,338,589; 5,344,884; 5,378,764; 5,494,965; 5,739,225; 5,795,941; 6,090,893; 6,340,730; 6,359,072; 6,388,017; 6,388,115; 6,403,717; 6,420,580; 6,441,096; 6,476,166; 6,534,604; 6,562,905; 6,605,675; 6,608,149; and WO 97/47682 and WO 94/22948. Other patents and publications are listed on the cover page of the patent.

SUMMARY

Various specific embodiments are described herein, and in the claims. Preferred polyethylene compositions herein are blend compositions that include at least one polyethylene that is preferably a bimodal high density polyethylene and at least one polyethylene that is preferably a unimodal polyethylene, as described elsewhere in greater detail. Persons skilled in the polyethylene art know that the type or form of catalyst used influences the molecular structure and properties of the polyethylene, and even slight changes in the type or form of the catalyst can sometimes dramatically affect certain properties of the resulting polyethylene.

Accordingly, one or more specific embodiments of the compositions described herein include a unimodal polyethylene that is made using a metallocene catalyst (the polyethylene being a referred to herein as a "metallocene-catalyzed polyethylene"). More preferably, certain specific embodiments include a unimodal polyethylene made using a metallocene that has two cyclopentadienyl rings, i.e., a "bis-Cp" metallocene, which most preferably also includes zirconium, and also preferably is substituted with a methyl group and a butyl group, e.g., bis(1,3-methylbutyldcyclopentadienyl)zirconium dichloride or difluoride. These metallocenes are discussed below in greater detail.

Also, one or more specific embodiments of the compositions described herein include a bimodal polyethylene, which is preferably made using a dual or mixed catalyst system, e.g., one of the dual or mixed catalyst systems described below in greater detail in connection with bimodal polyethylenes. For example, a dual catalyst system useful for forming a bimodal polyethylene is HN3, bis(2-(trimethylphenylamido)ethyl) amine zirconium dibenzyl (for a high molecular weight component) and P-metallocene catalyst bis(n-propyl Cp)zirconium dichloride (for a low molecular weight component). Bimodal polyethylenes and dual or mixed catalyst systems are also discussed below in greater detail. Further, certain specific embodiments of polyethylene compositions described herein surprisingly have more balanced TD/MD Tear properties than previously prepared polyethylene compositions. Such specific embodiments and the specific TD/MD levels are discussed in greater detail below.

In the past, compositions prepared by others have included certain types of bimodal polyethylene blended with certain types of unimodal polyethylene. However, films prepared from those compositions have exhibited TD/MD tear ratios that are actually higher (and thus worse) than TD/MD tear ratios of films made from compositions consisting only of bimodal polyethylene. In certain cases, the MD Elmendorf Tear decreases while the TD Elmendorf Tear increases. In contrast, films made from certain embodiments of the compositions described herein include particular types of bimodal polyethylene blended with particular types of unimodal polyethylene. It has been surprisingly discovered that these films have a lower TD/MD tear ratio than the TD/MD tear ratio of films made from a composition that consists only of that particular bimodal polyethylene, or even the TD/MD tear ratio of films made from blends of another type of bimodal polyethylene in combination with a unimodal polyethylene. Such lowering of the TD/MD ratio to a more balanced level is desirable, and without being bound by theory is considered to be attributable at least in part to the particular type of bimodal polyethylene (including those described herein) that is incorporated into the composition. Also, in certain embodiments the lowering of the TD/MD ratio is due in part to the nature of the unimodal polyethylene that is blended with the bimodal polyethylene. At least one of the factors associated with the improved TD/MD ratio is the particular catalyst system used.

Certain embodiments of the compositions described herein have a balanced TD/MD ratio. Different embodiments of films (including 0.5 mil and 1.0 mil films, as well as other gauges also) made of compositions that include a bimodal polyethylene blended with a unimodal polyethylene have a TD/MD tear ratio of 10 or less; or 9 or less; or 8 or less; or 7 or less; or 6 or less; or 5 or less; or 4 or less; or 3 or less; or 2 or less.

Further, certain embodiments of the composition have a TD Elmendorf Tear, including 0.5 mil and 1.0 mil, falling within one of a number of ranges, including TD Elmendorf Tear having a lower limit of 20, or 40, or 60, or 100, or 200; and an upper limit of 100, or 200, or 300, or 400, or 500, or even in certain embodiments 600, or 700; of 800, or 900, or 1000, or more. Thus, an illustrative range of TD Elmendorf Tear is 50 to 500.

Further, certain embodiments of the composition have an MD Elmendorf Tear, including 0.5 mil and 1.0 mil, that is preferably lower than TD Elmendorf Tear, and that preferably falls within any one of a number of ranges, including MD Elmendorf Tear having a lower limit of 5, or 10, or 15, or 20, or 25, or 30, or 40, or 50; with a an upper limit of 3, or 5, or 8, or 10, or 15, or 20, or 25, or 30, or 35, or 40, or 45, or 50.

DETAILED DESCRIPTION

Definitions and Properties

Various terms as used herein are defined below. To the extent a term used in a claim is not defined below, or elsewhere herein, it should be given the broadest definition persons in the pertinent art have given that term as reflected in printed publications and issued patents.

For purposes of convenience, various specific test procedures are identified for determining properties such as Elmendorf Tear, PDI, FI and MFR. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures may yield different results or measurements. Thus, a person of ordinary skill in the art is to expect experimental variations in measured properties that are reflected in the claims. All numerical values can be considered to be "about" or "approximately" the stated value, in view of the nature of testing in general.

Density is a physical property of a composition, is determined in accordance with ASTM-D-1505, and is expressed as grams per cubic centimeter (or grams per milliliter).

Except to the extent the actual density is specified, the term "high density" means any density of 0.940 g/cc or above, preferably 0.945 g/cc or above, or 0.950 g/cc or above, and more preferably 0.960 g/cc or above, and a preferable range of a high density composition is from 0.945 g/cc to 0.967 g/cc.

The term "polyethylene" means a polymer made of at least 50% ethylene-derived units, preferably at least 70% ethylene-derived units, more preferably at least 80% ethylene-derived units, or 90% ethylene-derived units, or 95% ethylene-derived units, or even 100% ethylene-derived units. The polyethylene can thus be a homopolymer or a copolymer, including a terpolymer, having other monomeric units. A polyethylene described herein may, for example, include units derived from a co-monomer that is preferably an α-olefin, e.g., propylene, 1-butene, 1-pentene, 1-hexene, or 1-octene. Other embodiments may include ethacrylate or methacrylate.

As used herein, the term "PDI" means polydispersity index, and means the same thing as "MWD" (molecular weight distribution), which is characterized herein using Size-Exclusion Chromatography (SEC). Molecular weight, including weight-average molecular weight (Mw) and number-average molecular weight (Mn), are determined using a High Temperature Size Exclusion (SEC) Chromatograph (either from Waters Corporation or Polymer Laboratories), equipped with a differential refractive index detector (DRI), an online light scattering detector, and a viscometer. Experimental details not described below, including how the detectors may be calibrated, are described in: T. Sun, P. Brant, R. R. Chance, and W. W. Graessley, Macromolecules, Volume 34, Number 19, 6812-6820, (2001).

Three Polymer Laboratories PLgel 10 mm Mixed-B columns should be used. The nominal flow rate should be 6.5 cm³/min, and the nominal injection volume should be 300 microliters. The various transfer lines, columns and differential refractometer (the DRI detector) are contained in an oven maintained at 135° C.

Solvent for the SEC experiment (described in the examples) was prepared by dissolving 6 grams of butylated hydroxy toluene as an antioxidant in 4 liters of Aldrich reagent grade 1,2,4-trichlorobenzene (TCB). The TCB mixture was then filtered through a 0.7 micrometers glass prefilter and subsequently through a 0.1 micrometers Teflon filter. The TCB was then degassed with an online degasser before entering the SEC.

Polymer solutions should be prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume are 1.463 g/ml at room temperature and 1.324 g/ml at 135° C. The injection concentration ranged from 1.0 to 2.0 mg/ml, with lower concentrations being used for higher molecular weight samples.

Prior to running each sample the DRI detector and the injector should be purged. Flow rate in the apparatus should then be increased to 0.5 ml/minute, and the DRI be allowed to stabilize for 8-9 hours before injecting the first sample. The LS laser should be turned on 1 to 1.5 hours before running samples by running the laser in idle mode for 20-30 minutes and then switching to full power in light regulation mode. Depending on the specific instrument used, data can be collected at a rate of 0.5 to 4.0 seconds for each "slice" (point.)

The concentration, c, at each point in the chromatogram should be calculated from the DRI output, i.e., the baseline-subtracted DRI signal, $I_{DRI}$, using the following Equation 1:

$$c = K_{DRI} I_{DRI} / (dn/dc) \qquad \text{Equation 1}$$

where $K_{DRI}$ is a constant determined by calibrating the DRI, and (dn/dc) is the same as described below for the LS analysis. Units on parameters throughout this description of the SEC method are such that concentration is expressed in g/cm³, molecular weight is expressed in g/mole, and intrinsic viscosity is expressed in dL/g.

The light scattering detector used should be either a Wyatt Technology High Temperature mini-DAWN or a Precision Detector 2040 LALLS. The data can be analyzed with the standard formula for static light scattering, i.e. Equation 2:

$$\frac{K_o c}{\Delta R(\theta, c)} = \frac{1}{M P(\theta)} + 2 A_2 c \qquad \text{Equation 2}$$

where $\Delta R(\theta,c)$ is the excess Rayleigh scattering intensity at scattering angle θ, c is the polymer concentration, M is the polymer molecular weight, $A_2$ is the second virial coefficient of the solution, P(θ) is the form factor, and $K_o$ is the optical constant for the system:

$$K_o = \frac{4\pi^2 n^2 (dn/dc)^2}{\lambda^4 N_A} \qquad \text{Equation 3}$$

in which $N_A$ is Avogadro's number, and dn/dc is the refractive index increment for the system. For the LALLS detector the scattering intensity is preferably measured at 15° and P(θ)=1 is assumed. The concentrations used in the analyses should be the values obtained from the DRI output. The refractive index n for TCB at 135 C for a 690 nm wavelength is 1.500. The value $A_2=0.0015$ mole·ml/gm$^2$ is used for ethylene-hexene and ethylene-butene polymers with less than 15 weight % comonomer. The value (dn/dc)=0.104 is used for polyethylene and ethylene-hexene copolymers and the value (dn/dc)=0.104×(1-0.126w) is used for ethylene-butene copolymers where w is the weight fraction of butane-derived units.

The viscometer that should be used is a Viscotek Corporation high temperature viscometer that has four capillaries arranged in a Wheatstone bridge configuration with two pressure transducers. The first transducer should measure the total pressure drop across the detector, and the other transducer, positioned between the two sides of the bridge, should be used to measure a differential pressure. The specific viscosity, $\eta_s$, for the solution flowing through the viscometer is calculated from their outputs. The intrinsic viscosity, $[\eta]$, at each point in the chromatogram is calculated from the following equation, where c was determined from the DRI output:

$$\eta_s = c[\eta] + 0.3(c[\eta])^2 \qquad \text{Equation 4}$$

The term "multimodal polyethylene composition" as used herein, means a composition that includes at least a bimodal polyethylene (or multimodal polyethylene), but the meaning of the term also encompasses a composition that is preferred herein, which is a blend of a bimodal polyethylene and a unimodal polyethylene.

The term "bimodal," when used herein to describe a polymer or polymer composition, e.g., polyethylene, means "bimodal molecular weight distribution," which term is understood as having the broadest definition persons in the pertinent art have given that term as reflected in printed publications and issued patents. For example, a single composition that includes polyolefins with at least one identifiable high molecular weight distribution and polyolefins with at least one identifiable low molecular weight distribution is considered to be a "bimodal" polyolefin, as that term is used herein. Preferably, other than having different molecular weights, the high molecular weight polyolefin and the low molecular weight polyolefin are both polyethylenes but may have different levels of comonomer distribution. A material with more than two different molecular weight distributions (sometimes referred to as a "multimodal" polymer) will be considered "bimodal" as that term is used herein.

The term "unimodal," as used herein to describe a polymer or polymer composition, means any polymer, e.g., polyethylene, that is not bimodal as defined above, e.g., one having a single molecular weight distribution.

The term "dual catalyst system" is intended to include a bimetallic catalyst as well as a multiple-catalyst system, and includes any composition, mixture or system that includes at least two different catalyst compounds, each having a different metal group. Preferably, each different catalyst compound resides on a single support particle, so that the dual or bimetallic catalyst is a supported dual or bimetallic catalyst. However, as used herein, the term bimetallic catalyst also broadly includes a system or mixture in which one of the catalysts resides on one collection of support particles, and another catalyst resides on another collection of support particles. Preferably, in that latter instance, the two supported catalysts are introduced to a single reactor, either simultaneously or sequentially, and polymerization is conducted in the presence of the dual or bimetallic catalyst system, i.e., the two collections of supported catalysts.

The TD Elmendorf Tear and MD Elmendorf Tear values refer to properties of a composition, or a polymer, or a film made of the polymer or composition being measured, and are measured according to ASTM D-1922-03. (The MD values refer to the machine direction while the TD values refer to the transverse direction.)

The term "FI" as used herein means $I_{21}$, which is measured in accordance with ASTM-1238, Condition E, at 190 degrees C.

The term "MFR $(I_{21}/I_2)$" as used herein means the ratio of $I_{21}$ (also referred to as FI) to $I_2$, and both $I_{21}$ and $I_2$ are measured in accordance with ASTM-1238, Condition E, at 190 degrees C.

SPECIFIC EMBODIMENTS

Various specific embodiments are described below, at least some of which are also recited in the claims.

For example, at least one specific embodiment is directed to a high density multimodal polyethylene composition, that has a density of 0.935 g/cc or more, and that includes a blend of a first polyethylene component and a second polyethylene component, in which: the first polyethylene component includes a bimodal polyethylene; and the second polyethylene component includes a unimodal polyethylene that is made from a polymerization conducted in the presence of a metallocene having two cyclopentadienyl rings.

At least one other specific embodiment is directed to a high density multimodal polyethylene composition, that has a density of 0.935 g/cc or more, and that includes a blend of a first polyethylene component and a second polyethylene component, in which: the first polyethylene component includes a bimodal polyethylene; and the second polyethylene component includes a unimodal polyethylene that is made from a polymerization conducted in the presence of a metallocene having two cyclopentadienyl rings.

Yet another other specific embodiment is directed to a high density multimodal polyethylene composition that has a density of 0.935 g/cc or more, and that includes a blend of a first polyethylene component and a second polyethylene component, in which: the first polyethylene component includes a bimodal polyethylene that includes a high molecular weight component and a lower molecular weight component, the bimodal polyethylene being made from a polymerization conducted in the presence of a catalyst system that includes HN3, bis(2-(trimethylphenylamido)ethyl)amine zirconium dibenzyl and P-metallocene catalyst bis(n-propyl Cp)zirconium dichloride or difluoride; and the second polyethylene component includes a unimodal polyethylene that is made from a polymerization conducted in the presence of metallocene.

Still another specific embodiment is directed to a high density multimodal polyethylene composition that has a density of 0.935 g/cc or more, and that includes a blend of a first polyethylene component and a second polyethylene component, in which: the first polyethylene component includes a bimodal polyethylene that includes a high molecular weight component and a lower molecular weight component, the bimodal polyethylene being made from a polymerization conducted in the presence of a dual catalyst system that includes metallocene; the second polyethylene component includes a unimodal polyethylene that is made from a polymerization conducted in the presence of metallocene; and the multimodal polyethylene composition has an Elmendorf Tear ratio (TD/MD) of less than 8, based on a 1.0 mil film made from the composition.

In one or more of the compositions identified above, or elsewhere herein, the metallocene used to make the unimodal polyethylene includes zirconium.

In one or more of the compositions identified above, or elsewhere herein, the metallocene used to make the unimodal polyethylene includes a methyl group.

In one or more of the compositions identified above, or elsewhere herein, the metallocene used to make the unimodal polyethylene includes a butyl group.

In one or more of the compositions identified above, or elsewhere herein, the metallocene used to make the unimodal polyethylene is bis(1,3-methylbutyldcyclopentadienyl)zirconium dichloride or difluoride.

In one or more of the compositions identified above, or elsewhere herein, the unimodal polyethylene occupies less than 20 wt % of the composition.

In one or more of the compositions identified above, or elsewhere herein, the unimodal polyethylene occupies less than 15 wt % of the composition.

In one or more of the compositions identified above, or elsewhere herein, the unimodal polyethylene occupies less than 10 wt % of the composition.

In one or more of the compositions identified above, or elsewhere herein, the Elmendorf Tear ratio (TD/MD) of the composition is 10 or less, based on a 1.0 mil film made from the composition.

In one or more of the compositions identified above, or elsewhere herein, the Elmendorf Tear ratio (TD/MD) of the composition is less than 8, based on a 1.0 mil film made from the composition.

In one or more of the compositions identified above, or elsewhere herein, the Elmendorf Tear ratio (TD/MD) of the composition is less than 5, based on a 1.0 mil film made from the composition.

In one or more of the compositions identified above, or elsewhere herein, the Elmendorf Tear ratio (TD/MD) of the composition is less than 8, based on a 0.5 mil film made from the composition.

In one or more of the compositions identified above, or elsewhere herein, the MD Elmendorf Tear of the composition is 50 grams or more, based on 1.0 mil film made from the composition.

In one or more of the compositions identified above, or elsewhere herein, the MD Elmendorf Tear of the composition is 100 grams or more, based on 1.0 mil film made from the composition.

In one or more of the compositions identified above, or elsewhere herein, the MD Elmendorf Tear of the composition is 130 grams or more, based on 1.0 mil film made from the composition.

In one or more of the compositions identified above, or elsewhere herein, the MD Elmendorf Tear of the composition is 10 grams or more, based on 0.5 mil film made from the composition.

In one or more of the compositions identified above, or elsewhere herein, the MD Elmendorf Tear of the composition is 15 grams or more, based on 0.5 mil film made from the composition.

In one or more of the compositions identified above, or elsewhere herein, the TD Elmendorf Tear of the composition is 180 grams or more, based on 1.0 mil film made from the composition.

In one or more of the compositions identified above, or elsewhere herein, the TD Elmendorf Tear of the composition is 400 grams or more, based on 1.0 mil film made from the composition.

In one or more of the compositions identified above, or elsewhere herein, the TD Elmendorf Tear of the composition is 500 grams or more, based on 1.0 mil film made from the composition.

In one or more of the compositions identified above, or elsewhere herein, the TD Elmendorf Tear of the composition is 20 grams or more, based on 0.5 mil film made from the composition.

In one or more of the compositions identified above, or elsewhere herein, the TD Elmendorf Tear of the composition is 60 grams or more, based on 0.5 mil film made from the composition.

In one or more of the compositions identified above, or elsewhere herein, the TD Elmendorf Tear of the composition is 100 grams or more, based on 0.5 mil film made from the composition.

In one or more of the compositions identified above, or elsewhere herein, the MFR ($I_{21}/I_2$) of the composition is 50 to 250.

In one or more of the compositions identified above, or elsewhere herein, the MFR ($I_{21}/I_2$) of the composition is 60 to 200.

In one or more of the compositions identified above, or elsewhere herein, the MFR ($I_{21}/I_2$) of the composition is 70 to 150.

In one or more of the compositions identified above, or elsewhere herein, the FI of the composition is 4 to 20.

In one or more of the compositions identified above, or elsewhere herein, the FI of the composition is 5 to 15.

In one or more of the compositions identified above, or elsewhere herein, the FI of the composition is 6 to 10.

In one or more of the compositions identified above, or elsewhere herein, the density of the composition is 0.930 to 0.965 g/cc.

In one or more of the compositions identified above, or elsewhere herein, the density of the composition is 0.935 to 0.960 g/cc.

In one or more of the compositions identified above, or elsewhere herein, the density of the composition is 0.940 to 0.955 g/cc.

In one or more of the compositions identified above, or elsewhere herein, the PDI of the composition is 30 to 70.

In one or more of the compositions identified above, or elsewhere herein, the PDI of the composition is 30 to 65.

In one or more of the compositions identified above, or elsewhere herein, the PDI of the composition is 30 to 60.

In one or more of the compositions identified above, or elsewhere herein, the bimodal polyethylene can have different characteristics and/or properties, and the bimodal polyethylene can be prepared using different catalyst systems. The various bimodal polyethylene resins, and the different catalyst systems, are described in greater detail below, under the subsection entitled "Bimodal Polyethylenes."

Metallocene Catalysts

As discussed below and elsewhere herein, a composition that includes a metallocene-catalyzed unimodal polyethylene is described. As used herein, the term "metallocene" is to be construed broadly, to include any compound that is described as a "metallocene" in a publication or patent, as well as any chemical compound or structure that is described herein as a metallocene.

In at least one broad embodiment, the metallocene catalyst is a compound represented by the formula $CP_m MR_n X_q$, wherein "Cp" refers to either a cyclopentadienyl ring, which may be substituted or unsubstituted, or a cyclopentadienyl ring derivative, such as an indenyl ring, which also may be substituted or unsubstituted. In a specific embodiment the metallocene used to make the unimodal polyethylene includes two cyclopentadienyl rings, and such a metallocene is referred to herein as a "biscyclopentadienyl metallocene"

or a "bis-Cp metallocene." Preferably, the metallocene used to form one of the polyethylenes, and preferably the metallocene used to form (e.g., prepare or make) the "second polyethylene" described herein (e.g., one of the two polyethylenes in a 2-polyethylene blend composition) has two or more Cp ligands, most preferably two Cp ligands; and is thus to be considered a "bis-Cp metallocene." In a more specific embodiment, the metallocene is a substituted biscyclopatendienyl, preferably one that is substituted with a methyl group and a butyl group, such as bis(1,3-methylbutyldcyclopentadienyl)zirconium dichloride or difluoride.

Other examples of metallocenes are identified in 1 & 2 Metallocene-Based Polyolefins (John Scheirs & W. Kaminsky eds., John Wiley & Sons, Ltd. 2000); G. G. Hlatky in 181 Coordination Chem. Rev. 243-296 (1999) and in particular, those metallocenes for use in the synthesis of polyethylene in 1 Metallocene-Based Polyolefins 261-377 (2000). The metallocene catalyst compounds described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components." Each metallocene described herein is preferably supported on a support material in a particular embodiment as described further below, and may be supported with or without another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, and more particularly, the atoms that make up the Cp ligands are preferably selected from the group consisting of carbon, nitrogen, oxygen, silicon, sulfur, phosphorous, germanium, boron and aluminum and combinations thereof, wherein carbon makes up at least 50% of the ring members. Even more particularly, the Cp ligand(s) are preferably selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopentacenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H4Ind"), substituted versions thereof (as described in more detail below), and heterocyclic versions thereof.

The metal atom "M" of the metallocene catalyst compound, as described throughout the specification and claims, may be selected from the group consisting of Groups 3 through 12 atoms and lanthanide Group atoms in one embodiment; and selected from the group consisting of Groups 3 through 10 atoms in a more particular embodiment, and selected from the group consisting of Sc, Ti, Zr, Hf, V, Nb, Ta, Mn, Re, Fe, Ru, Os, Co, Rh, Ir, and Ni in yet a more particular embodiment; and selected from the group consisting of Groups 4, 5 and 6 atoms in yet a more particular embodiment, and a Ti, Zr, Hf atoms in yet a more particular embodiment, and Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4. The groups bound the metal atom "M" are such that the compounds described below in the formulas and structures are electrically neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

In one aspect of the invention, the metallocene catalyst described herein can be represented by the formula (I):

$$Cp^A Cp^B MX_n \qquad (I)$$

wherein M is as described above; each X is chemically bonded to M; each Cp group is chemically bonded to M; and n is 0 or an integer from 1 to 4, and either 1 or 2 in a particular embodiment.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in structure (I) as well as ring substituents in structures (Va-d) include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular non-limiting examples of alkyl substituents R associated with formula (I) through (V) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X in the formula (I) above and for the formulas/structures (II) through (V) below is independently selected from the group consisting of: any leaving group in one embodiment; halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a more particular embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment; and fluoride in yet a more particular embodiment.

Other non-limiting examples of X groups in formula (I) include amines, amido compounds, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides and halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more X's form a part of a fused ring or ring system.

In another aspect of the invention, the metallocene catalyst component includes those of formula (I) where $Cp^A$ and $Cp^B$ are bridged to each other by at least one bridging group, (A), such that the structure is represented by formula (II):

$$Cp^A(A)Cp^B MX_n \qquad (II)$$

These bridged compounds represented by formula (II) are known as "bridged metallocenes". $Cp^A$, $Cp^B$, M, X and n in structure (II) are as defined above for formula (I); and wherein each Cp ligand is chemically bonded to M, and (A) is chemically bonded to each Cp. Non-limiting examples of bridging group (A) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above (for formula (I)) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, —$Si(R')_2Si(R'_2)$—, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In another embodiment, bridging group (A) may also be cyclic, comprising, for example 4 to 10, 5 to 7 ring members in a more particular embodiment. The ring members may be selected from the elements mentioned above, from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents are selected from the group consisting of hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group consisting of those having 4 to 10, more particularly 5, 6 or 7 ring members (selected from the group consisting of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formulae (I) and (II) are different from each other in one embodiment, and the same in another embodiment.

In yet another aspect of the invention, the metallocene catalyst components include bridged mono-ligand metallocene compounds (e.g., mono cyclopentadienyl catalyst components). In this embodiment, the at least one metallocene catalyst component is a bridged "half-sandwich" metallocene as in, for example, U.S. Pat. No. 5,055,438, represented by the formula (III):

$$Cp^A(A)QMX_n \qquad (III)$$

wherein $Cp^A$ is defined above and is bound to M; (A) is a bridging group bonded to Q and $Cp^A$; and wherein an atom from the Q group is bonded to M; and n is 0 or an integer from 1 to 3; 1 or 2 in a particular embodiment. In formula (III) above, $Cp^A$, (A) and Q may form a fused ring system. The X groups and n of formula (III) are as defined above in formula (I) and (II). In one embodiment, $Cp^A$ is selected from the group consisting of cyclopentadienyl, indenyl, tetrahydroindenyl, fluorenyl, substituted versions thereof, and combinations thereof.

In formula (III), Q is a heteroatom-containing ligand in which the bonding atom (the atom that is bonded with the metal M) is selected from the group consisting of Group 15 atoms and Group 16 atoms in one embodiment, and selected from the group consisting of nitrogen, phosphorus, oxygen or sulfur atom in a more particular embodiment, and nitrogen and oxygen in yet a more particular embodiment. Non-limiting examples of Q groups include alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene other compounds comprising Group 15 and Group 16 atoms capable of bonding with M.

In yet another aspect of the invention, the at least one metallocene catalyst component is an unbridged "half sandwich" metallocene represented by the formula (IVa):

$$C_p^A MQ_q X_n \qquad (IVa)$$

wherein $Cp^A$ is defined as for the Cp groups in (I) and is a ligand that is bonded to M; each Q is independently bonded to M; Q is also bound to $Cp^A$ in one embodiment; X is a leaving group as described above in (I); n ranges from 0 to 3, and is 1 or 2 in one embodiment; q ranges from 0 to 3, and is 1 or 2 in one embodiment. In one embodiment, $Cp^A$ is selected from the group consisting of cyclopentadienyl, indenyl, tetrahydroindenyl, fluorenyl, substituted version thereof, and combinations thereof.

In formula (IVa), Q is selected from the group consisting of $ROO^-$, $RO-$, $R(O)-$, $-NR-$, $-CR_2-$, $-S-$, $-NR_2$, $-CR_3$, $-SR$, $-SiR_3$, $-PR_2$, $-H$, and substituted and unsubstituted aryl groups, wherein R is selected from the group consisting of $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (IVb), such as described in, for example, U.S. Pat. No. 6,069,213:

$$Cp^4M(Q_2GZ)X_n \text{ or}$$

$$T(Cp^4M(Q_2GZ)X_n)_m \qquad (IVb)$$

wherein M, $Cp^A$, X and n are as defined above;

$Q_2GZ$ forms a polydentate ligand unit (e.g., pivalate), wherein at least one of the Q groups form a bond with M, and is defined such that each Q is independently selected from the group consisting of $-O-$, $-NR-$, $-CR_2-$ and $-S-$; G is either carbon or silicon; and Z is selected from the group consisting of R, $-OR$, $-NR_2$, $-CR_3$, $-SR$, $-SiR_3$, $-PR_2$, and hydride, providing that when Q is $-NR-$, then Z is selected from the group consisting of $-OR$, $-NR_2$, $-SR$, $-SiR_3$, $-PR_2$; and provided that neutral valency for Q is satisfied by Z; and wherein each R is independently selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys;

n is 1 or 2 in a particular embodiment; and

T is a bridging group selected from the group consisting of $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; wherein each T group bridges adjacent "$Cp^4M(Q_2GZ)X_n$" groups, and is chemically bonded to the $Cp^4$ groups.

m is an integer from 1 to 7; m is an integer from 2 to 6 in a more particular embodiment.

In another aspect of the invention, the at least one metallocene catalyst component can be described more particularly in structures (Va), (Vb), (Vc), (Vd) (Ve) and (Vf):

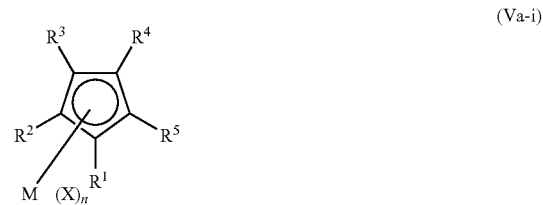

(Va-i)

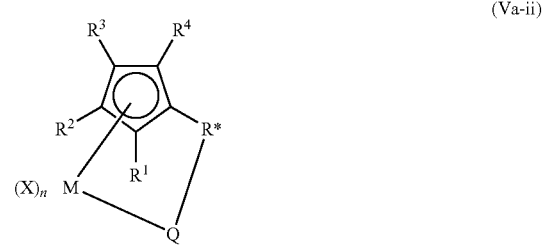

(Va-ii)

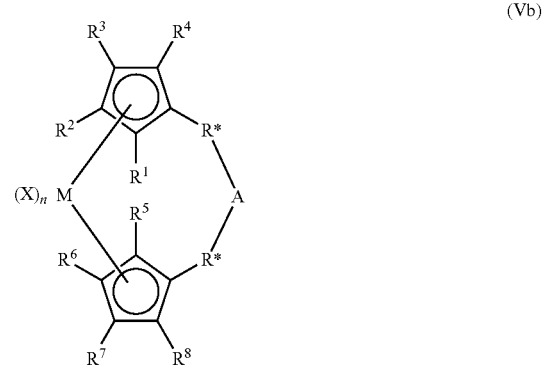

(Vb)

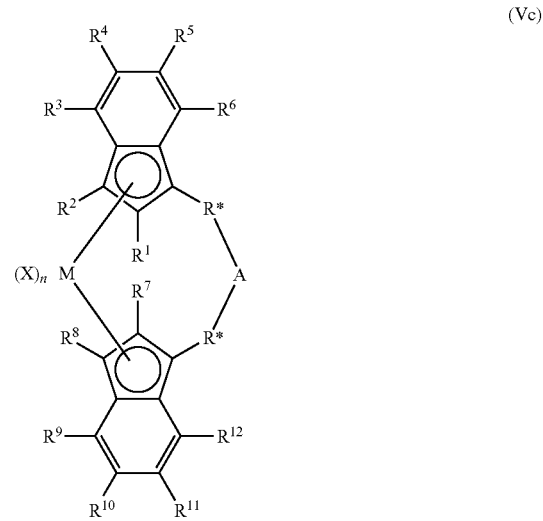

(Vc)

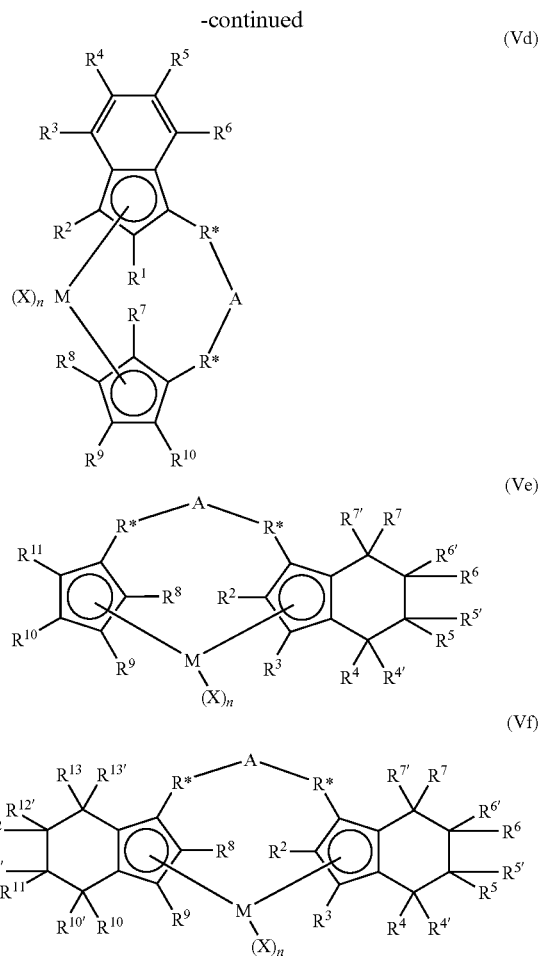

wherein in structures (Va) to (Vf) M is selected from the group consisting of Group 3 to Group 12 atoms, and selected from the group consisting of Group 3 to Group 10 atoms in a more particular embodiment, and selected from the group consisting of Group 3 to Group 6 atoms in yet a more particular embodiment, and selected from the group consisting of Group 4 atoms in yet a more particular embodiment, and selected from the group consisting of Zr and Hf in yet a more particular embodiment; and is Zr in yet a more particular embodiment;

wherein Q in (Va-ii) is selected from the group consisting of alkylenes, aryls, arylenes, alkoxys, aryloxys, amines, arylamines (e.g., pyridyl) alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates; wherein the saturated groups defining Q comprise from 1 to 20 carbon atoms in one embodiment; and wherein the aromatic groups comprise from 5 to 20 carbon atoms in one embodiment;

wherein each R* is independently: selected from the group consisting of hydrocarbylenes and heteroatom-containing hydrocarbylenes in one embodiment; and selected from the group consisting of alkylenes, substituted alkylenes and heteroatom-containing hydrocarbylenes in another embodiment; and selected from the group consisting of $C_1$ to $C_{12}$ alkylenes, $C_1$ to $C_{12}$ substituted alkylenes, and $C_1$ to $C_{12}$ heteroatom-containing hydrocarbylenes in a more particular embodiment; and selected from the group consisting of $C_1$ to $C_4$ alkylenes in yet a more particular embodiment; and wherein both R* groups are identical in another embodiment in structures (Vb-f);

A is as described above for (A) in structure (II), and more particularly, selected from the group consisting of a chemical bond, —O—, —S—, —SO$_2$—, —NR—, =SiR$_2$, =GeR$_2$, =SnR$_2$, —R$_2$SiSiR$_2$—, RP=, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups in one embodiment; and selected from the group consisting of $C_5$ to $C_8$ cyclic hydrocarbons, —CH$_2$CH$_2$—, =CR$_2$ and =SiR$_2$ in a more particular embodiment; wherein and R is selected from the group consisting of alkyls, cycloalkyls, aryls, alkoxys, fluoroalkyls and heteroatom-containing hydrocarbons in one embodiment; and R is selected from the group consisting of $C_1$ to $C_6$ alkyls, substituted phenyls, phenyl, and $C_1$ to $C_6$ alkoxys in a more particular embodiment; and R is selected from the group consisting of methoxy, methyl, phenoxy, and phenyl in yet a more particular embodiment;

wherein A may be absent in yet another embodiment, in which case each R* is defined as for $R^1$-$R^{13}$;

each X is as described above in (I);

n is an integer from 0 to 4, and from 1 to 3 in another embodiment, and 1 or 2 in yet another embodiment; and $R^1$ through $R^{13}$ (and $R^{4'}$ through $R^{7'}$ and $R^{10'}$ through $R^{13'}$) are independently: selected from the group consisting of hydrogen radical, halogen radicals, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in one embodiment; selected from the group consisting of hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, $C_7$ to $C_{18}$ fluoroalkylaryls in a more particular embodiment; and hydrogen radical, fluorine radical, chlorine radical, methyl, ethyl, propyl, isopropyl, butyl, isobutyl, tertiary butyl, hexyl, phenyl, 2,6-di-methylpheyl, and 4-tertiarybutylpheyl groups in yet a more particular embodiment; wherein adjacent R groups may form a ring, either saturated, partially saturated, or completely saturated.

The structure of the metallocene catalyst component represented by (Va) may take on many forms such as disclosed in, for example, U.S. Pat. No. 5,026,798, U.S. Pat. No. 5,703,187, and U.S. Pat. No. 5,747,406, including a dimer or oligomeric structure, such as disclosed in, for example, U.S. Pat. No. 5,026,798 and U.S. Pat. No. 6,069,213.

In a particular embodiment of the metallocene represented in (Vd), $R^1$ and $R^2$ form a conjugated 6-membered carbon ring system that may or may not be substituted.

Non-limiting examples of metallocene catalyst components consistent with the description herein include:

cyclopentadienylzirconium X$_n$,
indenylzirconium X$_n$,
(1-methylindenyl)zirconium X$_n$,
(2-methylindenyl)zirconium X$_n$,
(1-propylindenyl)zirconium X$_n$,
(2-propylindenyl)zirconium X$_n$,
(1-butylindenyl)zirconium X$_n$,
(2-butylindenyl)zirconium X$_n$,
(methylcyclopentadienyl)zirconium X$_n$, tetrahydroindenylzirconium $X_n$,
(pentamethylcyclopentadienyl)zirconium $X_n$,
cyclopentadienylzirconium $X_n$,
pentamethylcyclopentadienyltitanium $X_n$,
tetramethylcyclopentyltitanium $X_n$,
1,2,4-trimethylcyclopentadienylzirconium $X_n$,
dimethylsilyl(1,2,3,4-tetramethylcyclopentadienyl)(cyclopentadienyl)zirconium $X_n$,
dimethylsilyl(1,2,3,4-tetramethylcyclopentadienyl)(1,2,3-trimethyl-cyclopentadienyl)zirconium $X_n$,
dimethylsilyl(1,2,3,4-tetramethylcyclopentadienyl)(1,2-dimethyl-cyclopentadienyl)zirconium $X_n$,
dimethylsilyl(1,2,3,4-tetramethyl-cyclopentadienyl)(2-methylcyclopentadienyl)zirconium $X_n$,
dimethylsilyl(cyclopentadienyl)(indenyl)zirconium $X_n$,
dimethylsilyl(2-methylindenyl)(fluorenyl)zirconium $X_n$,
diphenylsilyl(1,2,3,4-tetramethyl-cyclopentadienyl)(3-propylcyclopentadienyl)zirconium $X_n$,
dimethylsilyl (1,2,3,4-tetramethylcyclopentadienyl)(3-t-butylcyclopentadienyl)zirconium $X_n$,
dimethylgermyl(1,2-dimethylcyclopentadienyl)(3-isopropylcyclopentadienyl)zirconium $X_n$,
dimethylsilyl(1,2,3,4-tetramethyl-cyclopentadienyl)(3-methylcyclopentadienyl)zirconium $X_n$,
diphenylmethylidene(cyclopentadienyl)(9-fluorenyl)zirconium $X_n$,
diphenylmethylidene(cyclopentadienyl)(indenyl)zirconium $X_n$,
iso-propylidenebis(cyclopentadienyl)zirconium $X_n$,
iso-propylidene(cyclopentadienyl)(9-fluorenyl)zirconium $X_n$,
iso-propylidene(3-methylcyclopentadienyl)(9-fluorenyl)zirconium $X_n$,
ethylenebis(9-fluorenyl)zirconium $X_n$,
meso-ethylenebis(1-indenyl)zirconium $X_n$,
ethylenebis(1-indenyl)zirconium $X_n$,
ethylenebis(2-methyl-1-indenyl)zirconium $X_n$,
ethylenebis(2-methyl-4,5,6,7-tetrahydro-1-indenyl)zirconium $X_n$,
ethylenebis(2-propyl-4,5,6,7-tetrahydro-1-indenyl)zirconium $X_n$,
ethylenebis(2-isopropyl-4,5,6,7-tetrahydro-1-indenyl)zirconium $X_n$,
ethylenebis(2-butyl-4,5,6,7-tetrahydro-1-indenyl)zirconium $X_n$,
ethylenebis(2-isobutyl-4,5,6,7-tetrahydro-1-indenyl)zirconium $X_n$,
dimethylsilyl(4,5,6,7-tetrahydro-1-indenyl)zirconium $X_n$,
diphenyl(4,5,6,7-tetrahydro-1-indenyl)zirconium $X_n$,
ethylenebis(4,5,6,7-tetrahydro-1-indenyl)zirconium $X_n$,
dimethylsilylbis(cyclopentadienyl)zirconium $X_n$,
dimethylsilylbis(9-fluorenyl)zirconium $X_n$,
dimethylsilylbis(1-indenyl)zirconium $X_n$,
dimethylsilylbis(2-methylindenyl)zirconium $X_n$,
dimethylsilylbis(2-propylindenyl)zirconium $X_n$,
dimethylsilylbis(2-butylindenyl)zirconium $X_n$,
diphenylsilylbis(2-methylindenyl)zirconium $X_n$,
diphenylsilylbis(2-propylindenyl)zirconium $X_n$,
diphenylsilylbis(2-butylindenyl)zirconium $X_n$,
dimethylgermylbis(2-methylindenyl)zirconium $X_n$,
dimethylsilylbis(tetrahydroindenyl)zirconium $X_n$,
dimethylsilylbis(tetramethylcyclopentadienyl)zirconium $X_n$,
dimethylsilyl(cyclopentadienyl)(9-fluorenyl)zirconium $X_n$,
diphenylsilyl(cyclopentadienyl)(9-fluorenyl)zirconium $X_n$,
diphenylsilylbis(indenyl)zirconium $X_n$,
cyclotrimethylenesilyl(tetramethylcyclopentadienyl)(cyclopentadienyl)zirconium $X_n$,
cyclotetramethylenesilyl(tetramethylcyclopentadienyl)(cyclopentadienyl)zirconium $X_n$,
cyclotrimethylenesilyl(tetramethylcyclopentadienyl)(2-methylindenyl)zirconium $X_n$,
cyclotrimethylenesilyl(tetramethylcyclopentadienyl)(3-methylcyclopentadienyl)zirconium $X_n$,
cyclotrimethylenesilylbis(2-methylindenyl)zirconium $X_n$,
cyclotrimethylenesilyl(tetramethylcyclopentadienyl)(2,3,5-trimethylcyclopentadienyl)zirconium $X_n$,
cyclotrimethylenesilylbis(tetramethylcyclopentadienyl)zirconium $X_n$,
dimethylsilyl(tetramethylcyclopentadieneyl)(N-tert-butylamido)titanium $X_n$,
bis(cyclopentadienyl)chromium $X_n$,
bis(cyclopentadienyl)zirconium $X_n$,
bis(n-butylcyclopentadienyl)zirconium $X_n$,
bis(n-dodecyclcyclopentadienyl)zirconium $X_n$,
bis(ethylcyclopentadienyl)zirconium $X_n$,
bis(iso-butylcyclopentadienyl)zirconium $X_n$,
bis(iso-propylcyclopentadienyl)zirconium $X_n$,
bis(methylcyclopentadienyl)zirconium $X_n$,
bis(n-oxtylcyclopentadienyl)zirconium $X_n$,
bis(n-pentylcyclopentadienyl)zirconium $X_n$,
bis(n-propylcyclopentadienyl)zirconium $X_n$,
bis(trimethylsilylcyclopentadienyl)zirconium $X_n$,
bis(1,3-bis(trimethylsilyl)cyclopentadienyl)zirconium $X_n$,
bis(1-ethyl-2-methylcyclopentadienyl)zirconium $X_n$,
bis(1-ethyl-3-methylcyclopentadienyl)zirconium $X_n$,
bis(pentamethylcyclopentadienyl)zirconium $X_n$,
bis(pentamethylcyclopentadienyl)zirconium $X_n$,
bis(1-propyl-3-methylcyclopentadienyl)zirconium $X_n$,
bis(1-n-butyl-3-methylcyclopentadienyl)zirconium $X_n$,
bis(1-isobutyl-3-methylcyclopentadienyl)zirconium $X_n$,
bis(1-propyl-3-butylcyclopentadienyl)zirconium $X_n$,
bis(1,3-n-butylcyclopentadienyl)zirconium $X_n$,
bis(4,7-dimethylindenyl)zirconium $X_n$,
bis(indenyl)zirconium $X_n$,
bis(2-methylindenyl)zirconium $X_n$,
cyclopentadienylindenylzirconium $X_n$,
bis(n-propylcyclopentadienyl)hafnium $X_n$,
bis(n-butylcyclopentadienyl)hafnium $X_n$,
bis(n-pentylcyclopentadienyl)hafnium $X_n$,
(n-propyl cyclopentadienyl)(n-butyl cyclopentadienyl)hafnium $X_n$,
bis[(2-trimethylsilylethyl)cyclopentadienyl]hafnium $X_n$,
bis(trimethylsilyl cyclopentadienyl)hafnium $X_n$,
bis(2-n-propylindenyl)hafnium $X_n$,
bis(2-n-butylindenyl)hafnium $X_n$,
dimethylsilylbis(n-propylcyclopentadienyl)hafnium $X_n$,
dimethylsilylbis(n-butylcyclopentadienyl)hafnium $X_n$,
bis(9-n-propylfluorenyl)hafnium $X_n$,
bis(9-n-butylfluorenyl)hafnium $X_n$,
(9-n-propylfluorenyl)(2-n-propylindenyl)hafnium $X_n$,
bis(1-n-propyl-2-methylcyclopentadienyl)hafnium $X_n$,
(n-propylcyclopentadienyl)(1-n-propyl-3-n-butylcyclopentadienyl)hafnium $X_n$,
dimethylsilyl(tetramethylcyclopentadienyl)(cyclopropylamido)titanium $X_n$,
dimethylsilyl(tetramethyleyclopentadienyl)(cyclobutylamido)titanium $X_n$,
dimethylsilyl(tetramethyleyclopentadienyl)(cyclopentylamido)titanium $X_n$,
dimethylsilyl(tetramethylcyclopentadienyl)(cyclohexylamido)titanium $X_n$, dimethylsilyl(tetramethylcyclopentadienyl)(cycloheptylamido)titanium $X_n$,
dimethylsilyl(tetramethylcyclopentadienyl)(cyclooctylamido)titanium $X_n$,
dimethylsilyl(tetramethylcyclopentadienyl)(cyclononylamido)titanium $X_n$,
dimethylsilyl(tetramethylcyclopentadienyl)(cyclodecylamido)titanium $X_n$,
dimethylsilyl(tetramethylcyclopentadienyl)(cycloundecylamido)titanium $X_n$,
dimethylsilyl(tetramethylcyclopentadienyl)(cyclododecylamido)titanium $X_n$,
dimethylsilyl(tetramethylcyclopentadienyl)(sec-butylamido)titanium $X_n$,
dimethylsilyl(tetramethylcyclopentadienyl)(n-octylamido)titanium $X_n$,
dimethylsilyl(tetramethylcyclopentadienyl)(n-decylamido)titanium $X_n$,
dimethylsilyl(tetramethylcyclopentadienyl)(n-octadecylamido)titanium $X_n$,
methylphenylsilyl(tetramethylcyclopentadienyl)(cyclopropylamido)titanium $X_n$,
methylphenylsilyl(tetramethylcyclopentadienyl)(cyclobutylamido)titanium $X_n$,
methylphenylsilyl(tetramethylcyclopentadienyl)(cyclopentylamido)titanium $X_n$,
methylphenylsilyl(tetramethylcyclopentadienyl)(cyclohexylamido)titanium $X_n$,
methylphenylsilyl(tetramethylcyclopentadienyl)(cycloheptylamido)titanium $X_n$,
methylphenylsilyl(tetramethylcyclopentadienyl)(cyclooctylamido)titanium $X_n$,
methylphenylsilyl(tetramethylcyclopentadienyl)(cyclononylamido)titanium $X_n$,
methylphenylsilyl(tetramethylcyclopentadienyl)(cyclodecylamido)titanium, $X_n$,
methylphenylsilyl(tetramethylcyclopentadienyl)(cycloundecylamido)titanium $X_n$,
methylphenylsilyl(tetramethylcyclopentadienyl)(cyclododecylamido)titanium $X_n$,
methylphenylsilyl(tetramethylcyclopentadienyl)(sec-butylamido)titanium $X_n$,
methylphenylsilyl(tetramethylcyclopentadienyl)(n-octylamido)titanium $X_n$,
methylphenylsilyl(tetramethylcyclopentadienyl)(n-decylamido)titanium $X_n$,
methylphenylsilyl(tetramethylcyclopentadienyl)(n-octadecylamido)titanium $X_n$,
diphenylsilyl(tetramethylcyclopentadienyl)(cyclopropylamido)titanium $X_n$,
diphenylsilyl(tetramethylcyclopentadienyl)(cyclobutylamido)titanium $X_n$,
diphenylsilyl(tetramethylcyclopentadienyl)(cyclopentylamido)titanium $X_n$,
diphenylsilyl(tetramethylcyclopentadienyl)(cyclohexylamido)titanium $X_n$,
diphenylsilyl(tetramethylcyclopentadienyl)(cycloheptylamido)titanium $X_n$,
diphenylsilyl(tetramethylcyclopentadienyl)(cyclooctylamido)titanium $X_n$,
diphenylsilyl(tetramethylcyclopentadienyl)(cyclononylamido)titanium $X_n$,
diphenylsilyl(tetramethylcyclopentadienyl)(cyclodecylamido)titanium $X_n$,
diphenylsilyl(tetramethylcyclopentadienyl)(cycloundecylamido)titanium $X_n$,
diphenylsilyl(tetramethylcyclopentadienyl)(cyclododecylamido)titanium $X_n$,
diphenylsilyl(tetramethylcyclopentadienyl)(sec-butylamido)titanium $X_n$,
diphenylsilyl(tetramethyleycloperitadienyl)(n-octylamido)titanium $X_n$,
diphenylsilyl(tetramethyleycloperitadienyl)(n-decylamido)titanium $X_n$,
diphenylsilyl(tetramethylcyclopentadienyl)(n-octadecylamido)titanium $X_n$, and derivatives thereof.

By "derivatives thereof", it is meant any substitution or ring formation as described above for structures (Va-f); and in particular, replacement of the metal "M" (Cr, Zr, Ti or Hf) with an atom selected from the group consisting of Cr, Zr, Hf and Ti; and replacement of the "X" group with any of $C_1$ to $C_5$ alkyls, $C_6$ aryls, $C_6$ to $C_{10}$ alkylaryls, fluorine or chlorine; n is 1, 2 or 3.

It is contemplated that the metallocene catalysts components described above include their structural or optical or enantiomeric isomers (racemic mixture), and may be a pure enantiomer in one embodiment.

As used herein, a single, bridged, asymmetrically substituted metallocene catalyst component having a racemic and/or meso isomer does not, itself, constitute at least two different bridged, metallocene catalyst components. In a preferred embodiment, the metallocenes described herein are in their racemic form.

The "metallocene catalyst component" useful in the present invention may comprise any combination of any "embodiment" described herein.

Bimodal Polyethylenes

One or more specific embodiments of the compositions described herein include a bimodal polyethylene. In certain embodiments, a bimodal polyethylene for the composition may be prepared as described in U.S. Pat. No. 6,605,675 or U.S. Pat. No. 6,608,149, both of which are incorporated by reference, particularly the aspects that disclose and teach the preparation of bimodal polyethylene.

In at least one particular embodiment, a composition includes a bimodal polyethylene prepared using catalyst systems described below.

For example, a bimodal polyethylene can be prepared by a polymerization conducted in the presence of a catalyst system that includes a fumed particulate filler and a catalyst compound represented by the formula:

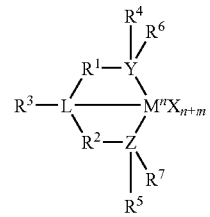

wherein M is a Group 4, 5 or 6 metal; each X is independently an anionic leaving group; n is the oxidation state of M; m is the formal charge of the ligand comprising Y, Z and L; Y is a Group 15 atom; Z is a Group 15 atom; L is a Group 15 atom; $R^1$ and $R^2$ are independently a $C_1$ to $C_{20}$ hydrocarbon group, or a heteroatom containing group wherein the heteroatom is silicon, germanium, tin, lead, or phosphorus; optionally, $R^1$ and $R^2$ are interconnected to each other; $R^3$ is absent, a hydrogen, a group 14 atom containing group, a halogen, or a heteroatom containing group; $R^4$ and $R^5$ are independently an alkyl group, an aryl group, a substituted aryl group, a cyclic alkyl group, a substituted cyclic alkyl group, or a multiple ring system; and $R^6$ and $R^7$ are independently absent, a hydrogen, an alkyl group, a halogen, a heteroatom, a hydrocarbyl group, or a heteroatom containing group.

The catalyst system can include a metallocene compound. In one or more specific embodiments, referring to the catalyst formula above, M can be zirconium or hafnium. In one or more specific embodiments, referring to the catalyst formula above, each X may be independently a hydrogen, a halogen or a hydrocarbyl group. In one or more specific embodiments, referring to the catalyst formula above, $R^1$ and $R^2$ can be independently a $C_2$ to $C_6$ hydrocarbon group. In one or more specific embodiments, referring to the catalyst formula above, $R^1$ and $R^2$ can be a $C_1$ to $C_{20}$ alkylene, $C_5$ to $C_{20}$ arylene or $C_5$ to $C_{20}$ arylalkylene group. In one or more specific embodiments, referring to the catalyst formula above, m can be 0, −1, −2, or −3 and n is +3, +4 or +5. In one or more specific embodiments, referring to the catalyst formula above, $R^3$ can be hydrogen or a methyl group.

In one or more specific embodiments, referring to the catalyst formula above, $R^4$ and $R^5$ can be independently an alkyl group, an aryl group, a substituted aryl group, a cyclic alkyl group, a substituted cyclic alkyl group, or a multiple ring system having up to 20 carbon atoms.

In one or more specific embodiments, referring to the catalyst formula above, $R^4$ and $R^5$ are independently a $C_1$ to $C_{20}$ aryl group or a $C_5$ to $C_{20}$ arylalkyl group. In one or more specific embodiments, referring to the catalyst formula above, $R^4$ and $R^5$ are independently a cyclic arylalkyl group.

In one or more specific embodiments, referring to the catalyst formula above, $R^4$ and $R^5$ are independently a group represented by the following formula:

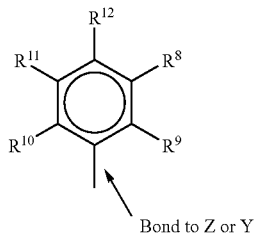

Bond to Z or Y wherein each $R^8$ to $R^{12}$ are independently hydrogen, a $C_1$ to $C_{20}$ alkyl group, a heteroatom, or a heteroatom containing group having up to 40 carbon atoms, and any two $R^{8-12}$ groups can combine to form a cyclic group or a heterocyclic group.

In one or more specific embodiments, referring to the catalyst formula above, $R^9$, $R^{10}$ and $R^{12}$ are methyl and $R^8$ and $R^{11}$ are hydrogen.

In one or more specific embodiments, referring to the catalyst formula above, the catalyst system may further include an activator, wherein the activator is selected from the group consisting of alkyl aluminum compounds, alumoxanes, modified alumoxanes, non-coordinating anions, boranes, borates, ionizing compounds, and combinations thereof.

In one or more specific embodiments, referring to the catalyst formula above, the catalyst system further includes mineral oil.

In one or more specific embodiments, referring to the catalyst formula above, the catalyst system is a slurry of solids, the solids concentration ranging from 10 to 15 wt %.

In one or more specific embodiments, referring to the catalyst formula above, the catalyst system has a particle size up to 25 μm.

In one or more specific embodiments, referring to the catalyst formula above, the catalyst system includes a particulate filler having an average particle size of 0.001 microns to 1 micron.

In one or more specific embodiments, referring to the catalyst formula above, the catalyst system includes a particulate filler that has been treated with dimethylsilyldichloride.

In one or more specific embodiments, referring to the catalyst formula above, the bimodal polyethylene can be made by a polymerization conducted in the presence of a catalyst system that includes a slurry of mineral oil, particulate filler, a metallocene catalyst compound, and a catalyst compound represented by the formula:

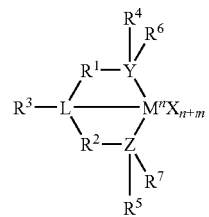

wherein M is a Group 4, 5 or 6 metal; each X is independently an anionic leaving group; n is the oxidation state of M; m is the formal charge of the ligand comprising Y, Z and L; Y is a Group 15 atom; Z is a Group 15 atom; L is a Group 15 atom; $R^1$ and $R^2$ are independently a $C_1$ to $C_{20}$ hydrocarbon group, or a heteroatom containing group wherein the heteroatom is silicon, germanium, tin, lead, or phosphorus; optionally, $R^1$ and $R^2$ are interconnected to each other; $R^3$ is absent, a hydrogen, a group 14 atom containing group, a halogen, or a heteroatom containing group; $R^4$ and $R^5$ are independently an alkyl group, an aryl group, a substituted aryl group, a cyclic alkyl group, a substituted cyclic alkyl group, or a multiple ring system; and $R^6$ and $R^7$ are independently absent, a hydrogen, an alkyl group, a halogen, a heteroatom, a hydrocarbyl group, or a heteroatom containing group.

In one or more specific embodiments, referring to the catalyst formula above, the metallocene compound is a bridged or unbridged zirconocene or hafnocene metallocene compound.

In one or more specific embodiments, referring to the catalyst formula above, wherein M is zirconium or hafnium.

In one or more specific embodiments, referring to the catalyst formula above, each X is independently a hydrogen, a halogen or a hydrocarbyl group In one or more specific embodiments, referring to the catalyst formula above, $R^1$ and $R^2$ are independently a $C_1$ to $C_6$ hydrocarbon group.

In one or more specific embodiments, referring to the catalyst formula above, $R^1$ and $R^2$ are selected from $C_2$ to $C_6$ hydrocarbon groups.

In one or more specific embodiments, referring to the catalyst formula above, m is 0, −1, −2, or −3 and n is +3, +4 or +5.

In one or more specific embodiments, referring to the catalyst formula above, $R^3$ is hydrogen or a methyl group.

In one or more specific embodiments, referring to the catalyst formula above, $R^4$ and $R^5$ are independently an alkyl group, an aryl group, a substituted aryl group, a cyclic alkyl group, a substituted cyclic alkyl group, or a multiple ring system having up to 20 carbon atoms.

In one or more specific embodiments, referring to the catalyst formula above, wherein $R^4$ and $R^5$ are substituted aryl groups.

In one or more specific embodiments, referring to the catalyst formula above, wherein $R^4$ and $R^5$ are independently a cyclic arylalkyl group.

In one or more specific embodiments, referring to the catalyst formula above, $R^4$ and $R^5$ are independently a group represented by the following formula:

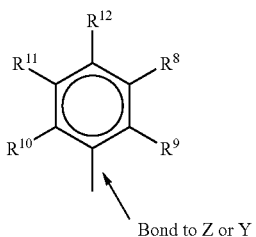

Bond to Z or Y wherein each $R^8$ to $R^{12}$ are independently hydrogen, a $C_1$ to $C_{20}$ alkyl group, a heteroatom, or a heteroatom containing group having up to 40 carbon atoms, and any two $R^{8-12}$ groups can combine to form a cyclic group or a heterocyclic group.

In one or more specific embodiments, referring to the catalyst formula above, $R^9$, $R^{10}$ and $R^{12}$ are methyl and $R^8$ and $R^{11}$ are hydrogen.

In one or more specific embodiments, referring to the catalyst formula above, the catalyst system further includes an activator, wherein the activator is selected from the group consisting of alkyl aluminum compounds, alumoxanes, modified alumoxanes, non-coordinating anions, boranes, borates, ionizing compounds, and combinations thereof.

In one or more specific embodiments, referring to the catalyst formula above, the composition is a slurry of solids, the solids concentration ranging from 10 to 15 wt %.

In one or more specific embodiments, referring to the catalyst formula above, the composition has a particle size up to 25 μm.

In one or more specific embodiments, referring to the catalyst formula above, the particulate filler has an average particle size of 0.001 microns to 1 micron.

In one or more specific embodiments, referring to the catalyst formula above, the particulate filler is fumed silica.

In one or more specific embodiments, referring to the catalyst formula above, the particulate filler comprises silica, the activator comprises an alumoxane; wherein the silica comprises from 50 to 60 wt % of the dried support, catalyst compound and activator composition.

In one or more specific embodiments, referring to the catalyst formula above, the activator, particulate filler and at least one catalyst compound are spray-dried.

Polymerization Processes

The polymerization process used to form any of the polymers described herein, e.g., either of the polyethylene components used to make the blends, may be carried out using any suitable process, for example, high pressure, solution, slurry and gas phase. Certain polyethylenes can be made using a gas phase polymerization process, e.g., utilizing a fluidized bed reactor. This type reactor and means for operating the reactor are well known and completely described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

A polymerization process may be effected as a continuous gas phase process such as a fluid bed process. A fluid bed reactor may comprise a reaction zone and a so-called velocity reduction zone. The reaction zone may comprise a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

The reactor temperature of the fluid bed process herein preferably ranges from 30° C. or 40° C. or 50° C. to 90° C. or 100° C. or 110° C. or 120° C. or 150° C. In general, the reactor temperature is operated at the highest temperature that is feasible taking into account the sintering temperature of the polymer product within the reactor. Regardless of the process used to make the polyolefins of the invention, the polymerization temperature, or reaction temperature should be below the melting or "sintering" temperature of the polymer to be formed. Thus, the upper temperature limit in one embodiment is the melting temperature of the polyolefin produced in the reactor.

A slurry polymerization process can also be used. A slurry polymerization process generally uses pressures in the range of from 1 to 50 atmospheres and even greater and temperatures in the range of 0° C. to 120° C., and more particularly from 30° C. to 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

Also useful is particle form polymerization, a process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. Nos. 4,613,484 and 2 Metallocene-Based Polyolefins 322-332 (2000).

These processes can be used for the production of homopolymers of olefins, particularly ethylene, and/or copolymers, terpolymers, and the like, of olefins, particularly ethylene, and at least one or more other olefin(s). Preferably the olefins are α-olefins. The olefins, for example, may contain from 2 to 16 carbon atoms in one embodiment; and in another embodiment, ethylene and a comonomer comprising from 3 to 12 carbon atoms in another embodiment; and ethylene and a comonomer comprising from 4 to 10 carbon atoms in yet another embodiment; and ethylene and a comonomer comprising from 4 to 8 carbon atoms in yet another embodiment. Particularly preferred are polyethylenes. Such polyethylenes are preferably homopolymers of ethylene and interpolymers of ethylene and at least one α-olefin wherein the ethylene content is at least about 50% by weight of the total monomers involved. Exemplary olefins that may be utilized herein are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In the production of polyethylene or polypropylene, comonomers may be present in the polymerization reactor. When present, the comonomer may be present at any level with the ethylene or propylene monomer that will achieve the desired weight percent incorporation of the comonomer into the finished resin. In one embodiment of polyethylene production, the comonomer is present with ethylene in a mole ration of from 0.0001 (comonomer:ethylene) to 50, and from 0.0001 to 5 in another embodiment, and from 0.0005 to 1.0 in yet another embodiment, and from 0.001 to 0.5 in yet another embodiment. Expressed in absolute terms, in making polyethylene, the amount of ethylene present in the polymerization reactor may range to up to 1000 atmospheres pressure in one embodiment, and up to 500 atmospheres pressure in another embodiment, and up to 200 atmospheres pressure in yet another embodiment, and up to 100 atmospheres in yet another embodiment, and up to 50 atmospheres in yet another embodiment.

Hydrogen gas is often used in olefin polymerization to control the final properties of the polyolefin, such as described in Polypropylene Handbook 76-78 (Hanser Publishers, 1996). Using certain catalyst systems, increasing concentrations (partial pressures) of hydrogen can increase the melt flow rate (MFR) (also referred to herein as melt index (MI)) of the polyolefin generated. The MFR or MI can thus be influenced by the hydrogen concentration. The amount of hydrogen in the polymerization can be expressed as a mole ratio relative to the total polymerizable monomer, for example, ethylene, or a blend of ethylene and hexane or propene. The amount of hydrogen used in the polymerization process of the present invention is an amount necessary to achieve the desired MFR or MI of the final polyolefin resin. In one embodiment, the mole ratio of hydrogen to total monomer ($H_2$:monomer) is in a range of from greater than 0.0001 in one embodiment, and from greater than 0.0005 in another embodiment, and from greater than 0.001 in yet another embodiment, and less than 10 in yet another embodiment, and less than 5 in yet another embodiment, and less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 5000 ppm, and up to 4000 ppm in another embodiment, and up to 3000 ppm in yet another embodiment, and between 50 ppm and 5000 ppm in yet another embodiment, and between 500 ppm and 2000 ppm in another embodiment.

Further, it is common to use a staged reactor employing two or more reactors in series, wherein one reactor may produce, for example, a high molecular weight component and another reactor may produce a low molecular weight component. In one embodiment of the invention, the polyolefin is produced using a staged gas phase reactor. Such commercial polymerization systems are described in, for example, 2 Metallocene-Based Polyolefins 366-378 (John Scheirs & W. Kaminsky, eds. John Wiley & Sons, Ltd. 2000); U.S. Pat. No. 5,665,818, U.S. Pat. No. 5,677,375; U.S. Pat. No. 6,472,484; EP 0 517 868 and EP-A-0 794 200.

The one or more reactor pressures in a gas phase process (either single stage or two or more stages) may vary from 100 psig (690 kPa) to 500 psig (3448 kPa), and in the range of from 200 psig (1379 kPa) to 400 psig (2759 kPa) in another embodiment, and in the range of from 250 psig (1724 kPa) to 350 psig (2414 kPa) in yet another embodiment.

The gas phase reactor employing the catalyst system described herein is capable of producing from 500 lbs of polymer per hour (227 Kg/hr) to 200,000 lbs/hr (90,900 Kg/hr), and greater than 1000 lbs/hr (455 Kg/hr) in another embodiment, and greater than 10,000 lbs/hr (4540 Kg/hr) in yet another embodiment, and greater than 25,000 lbs/hr (11,300 Kg/hr) in yet another embodiment, and greater than 35,000 lbs/hr (15,900 Kg/hr) in yet another embodiment, and greater than 50,000 lbs/hr (22,700 Kg/hr) in yet another embodiment, and from 65,000 lbs/hr (29,000 Kg/hr) to 100,000 lbs/hr (45,500 Kg/hr) in yet another embodiment.

A slurry or gas phase process can be operated in the presence of a bulky ligand metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc and the like. By "essentially free", it is meant that these compounds are not deliberately added to the reactor or any reactor components, and if present, are present to less than 1 ppm in the reactor.

One or all of the catalysts can be combined with up to 10 wt % of a metal-fatty acid compound, such as, for example, an aluminum stearate, based upon the weight of the catalyst system (or its components), such as disclosed in U.S. Pat. Nos. 6,300,436 and 5,283,278. Other suitable metals include other Group 2 and Group 5-13 metals. In an alternate embodiment, a solution of the metal-fatty acid compound is fed into the reactor. In yet another embodiment, the metal-fatty acid compound is mixed with the catalyst and fed into the reactor separately. These agents may be mixed with the catalyst or may be fed into the reactor in a solution or a slurry with or without the catalyst system or its components.

Supported catalyst(s) can be combined with the activators and are combined, such as by tumbling and other suitable means, with up to 2.5 wt % (by weight of the catalyst composition) of an antistatic agent, such as an ethoxylated or methoxylated amine, an example of which is Kemamine AS-990 (ICI Specialties, Bloomington Del.).

EXAMPLES

The following examples discuss different polyethylene resins, different compositions, and films made from such compositions.

Example 1

This example discusses the preparation and physical properties of a bimodal polyethylene and two different types of unimodal polyethylene resins. See Table 1. The Sample 1 bimodal polyethylene was prepared in a single gas phase reactor, in the presence of a mixed catalyst system that included 2,4,6 trimethylphenyl HN3 zirconium dibenzyl, for generating the higher molecular weight component of the bimodal polyethylene composition, and bis(n-propyl cyclopentadienyl)zirconium dichloride, for generating the lower molecular weight component of the bimodal polyethylene composition. The Sample 2 unimodal resin was a linear low density polyethylene (LLDPE) made from a bis(1,3-methyl-butyldcyclopentadienyl)zirconium dichloride metallocene catalyst. The Sample 3 unimodal resin was ST 2005, a linear low density polyethylene (LLDPE) resin composition sold commercially by Dow Chemical Co., also called "Super Tuflin," produced by UCAT A, which is a Ziegler-Natta catalyst.

TABLE 1

|  | Sample 1 (Sample 4) | Sample 2 | Sample 3 |
|---|---|---|---|
| Resin Properties: |  |  |  |
| MI (I2) | 0.059 (0.062) | 0.989 | 0.888 |
| FI (I21) | 6.87 (7.21) | 15.66 | 22.13 |
| MFR (I21/I2) | 116 (116) | 15.8 | 24.9 |
| Density (g/cc) | 0.9491 (0.9536) | 0.9181 | 0.9153 |
| SEC data: |  |  |  |
| Mn | NA (4,654) | 47,616 | 25,838 |
| Mw | NA (256,250) | 118,847 | 123,498 |
| Mw/Mn | NA (55.1) | 2.49 | 4.78 |
| Mz | NA (1,143,034) | 212,129 | 348,074 |
| CLMS (%) | NA (4.18) |  | 0.15 |
| CHMS (%) | NA (15.3) | 1.02 | 3.59 |

Example 2

This example discusses the blend compositions prepared using the Sample 1 bimodal resin together with Samples 2 or 3 unimodal resins, all described in Example 1. Up to 20 wt % of each unimodal resin was added to the bimodal resin, by dry blending and then melt compounding.

To make blends, pellets of the different resins were mixed in a tumble mixer at predetermined blend ratios. Each pellet mixture was compounded on a single screw Prodex pelletizer. The Sample 1 bimodal resin was re-compounded on the same extruder (pelletizer) to maintain the same melt shear history as that of the blends described below. Accordingly, referring to Table 1, the parenthetical values for Sample 1 represent properties of the re-compounded version of Sample 1, referred to herein as Sample 4.

Table 2 discloses resin property details for each blend, including the re-compounded bimodal resin (Sample 4). Samples 5, 6 and 7 are compositions that include Sample 1 resin blended with varying amounts (10 wt %, 15 wt % and 20 wt %) of the Sample 3 unimodal resin (ST 2005). Samples 8, 9 and 10 are compositions that include Sample 1 resin blended with varying amounts (10 wt %, 15 wt % and 20 wt %) of the Sample 2 unimodal resin.

It was observed that both MI and FI of the blends increased as the wt % of each unimodal resin increased. In contrast, the MFR of the blends tended to show a decreasing trend as the wt % of each unimodal resin increased. The density of the blends dropped with the addition of unimodal resin. Table 3 indicates molecular information for the same compositions characterized in Table 2. Polydispersity (Mw/Mn) was observed to decrease as the percentage of unimodal polyethylene in the composition increased.

TABLE 2

|  | Sample 4 | Sample 5 | Sample 6 | Sample 7 | Sample 8 | Sample 9 | Sample 10 |
|---|---|---|---|---|---|---|---|
| Wt. % of LLDPE (Samples 2 or 3) | 0 | 10 | 15 | 20 | 10 | 15 | 20 |
| MI (I2) | 0.062 | 0.081 | 0.086 | 0.108 | 0.087 | 0.097 | 0.111 |
| FI (I21) | 7.21 | 8.43 | 9.27 | 9.50 | 7.89 | 7.98 | 8.33 |
| MFR (I21/I2) | 116.1 | 104.6 | 107.8 | 87.9 | 92.9 | 85.7 | 76.5 |
| Density (g/cc) | 0.9536 | 0.9467 | 0.9453 | 0.9435 | 0.9448 | 0.9448 | 0.9433 |

TABLE 3

|  | Sample 4 | Sample 5 | Sample 6 | Sample 7 | Sample 8 | Sample 9 | Sample 10 |
|---|---|---|---|---|---|---|---|
| Mn | 4,654 | 4,946 | 6,047 | 6,234 | 6,517 | 5,534 | 5,979 |
| Mw | 256,250 | 265,348 | 261,712 | 237,250 | 257,281 | 266,176 | 247,460 |
| Mw/Mn | 55.1 | 53.65 | 43.3 | 38.1 | 39.5 | 48.1 | 41.4 |
| Mz | 1,143,034 | 1,214,098 | 1,234,718 | 1,112,840 | 1,154,011 | 1,221,539 | 1,174,441 |
| CLMS (%) | 4.18 | 3.99 | 3.17 | 3.10 | 2.91 | 3.37 | 3.27 |
| CHMS (%) | 15.3 | 15.37 | 14.23 | 13.01 | 14.17 | 14.76 | 13.29 |

Example 3

This example discusses preparation of films from the various resin compositions described above. Both the resin blends and the re-compounded bimodal resin (Sample 4) were film extruded on the Alpine film extrusion line, which was equipped with a 50 mm, 18:1 L/D screw, 100 mm annular die (1 mm die gap). The temperature profile (degrees F.) was set at 390/400/400/400/410/410/410/410 for Zones 1/2/3/4/5/6/7/8. Zones 1 and 2 are for screws. Zones 3, 4 and 5 are for adapter block. Zones 6, 7 and 8 are for die. Blow-up ratio (diameter of blown bubble divided by die diameter) was maintained at 4.0 throughout the runs. The take-up speed was 92 fpm and 184 fpm respectively, for 1.0 mil and 0.5 mil films. Cooling air flow rate was adjusted to maintain the frost line height ratio at 9.0. The frost line height ratio is a ratio between the height of frost line and the die diameter. At a constant output rate, the extrusion head pressure decreased as the blend ratio of unimodal resin increases while the motor load slightly decreased or remained the same. The decreasing effect was more prominent for ST2005 than for Sample 2 resin. The bubble stability of all the blends (up to 20% of unimodal resin) was good, producing 0.5 mil film without any difficulties. The film appearance rate of the blends was good (+40) with no gels or melt fracture appearing. The film surface showed no sign of poor homogeneity. Table 4 summarizes the film extrusion conditions. Further, it was noted that overall film extrudability of the blends was also improved with less motor load and extrusion head pressure without losing any bubble stability.

TABLE 4

|  | Sample 4 | Sample 5 | Sample 6 | Sample 7 | Sample 8 | Sample 9 | Sample 10 |
|---|---|---|---|---|---|---|---|
| Die set temp. (° F.) | 410 | 410 | 410 | 410 | 410 | 410 | 410 |
| Screw RPM | 93 | 93 | 93 | 93 | 93 | 93 | 93 |
| Screw amps. | 62 | 61 | 61 | 59 | 62 | 62 | 62 |
| Head pressure (psi) | 8,500 | 8,250 | 8,050 | 7,800 | 8,350 | 8,150 | 8,000 |
| Rate (lb/hr) | 95 | 96 | 95 | 93 | 96 | 97 | 96 |
| FAR | +40 | +40 | +40 | +40 | +40 | +40 | +40 |
| BUR | 4 | 4 | 4 | 4 | 4 | 4 | 4 |
| Bubble stability | Good | Good | Good | Good | Good | Good | Good |
| Gels | No | No | No | No | No | No | No |
| FHR* (Frost-line Height/Die Diameter) | 9 | 9 | 9 | 9 | 9 | 9 | 9 |

Example 5

This example discusses properties of the films. Surprisingly, the Elmendorf Tear results depended on which unimodal resin was used. Blends with Sample 2 resin exhibited not only enhanced MD and TD film tear but also a more balanced TD/MD tear ratio for both 1.0 and 0.5 mil films. For blends having 10% and 15% of m-LLDPE, the TD/MD tear ratio for 1.0 mil film was reduced to 3.8 and 3.7, respectively, from 10.6. For 0.5 mil film the TD/MD ratio reduced to 2.0 and 4.5, respectively, from 7.8. In contrast, blends that included ST2005 showed little impact on MD tear for both 1.0 and 0.5 mil film. The TD tear seemed to increase a little as the wt % of that particular unimodal resin increased. As reflected in Table 5, film puncture resistance also increased in proportion to increased amounts of the Sample 2 unimodal polyethylene in the composition.

TABLE 5

|  | Film gague (mil) | Sample 4 | Sample 5 | Sample 6 | Sample 7 | Sample 8 | Sample 9 | Sample 10 |
|---|---|---|---|---|---|---|---|---|
| Dart impact strength (g) | 1.0 | 160 | 125 | 135 | 125 | 230 | 130 | 185 |
|  | 0.5 | 320 | 170 | 160 | 133 | 220 | 170 | 160 |
| Tensile strength @peak, psi (MD/TD) | 1.0 | 10,800/7,700 | 10,440/6,560 | 9,200/5,135 | 9,000/6,740 | 7,470/6,440 | 8,780/6,300 | 9,000/6,570 |
|  | 0.5 | 12,340/9,000 | 10,400/7,200 | 11,270/6,090 | 13,060/7,170 | 10,960/10,000 | 6,990/4,710 | 9,830/7,070 |
| % elongation @break (MD/TD) | 1.0 | 380/530 | 410/570 | 400/590 | 380/610 | 450/520 | 390/580 | 445/520 |
|  | 0.5 | 267/400 | 240/390 | 290/540 | 290/500 | 290/350 | 276/310 | 280/520 |
| Secant | 1.0 | 116/137 | 98/132 | 96/120 | 94/112 | 91/96 | 83/89 | 83/89 |

TABLE 5-continued

| | Film gauge (mil) | Sample 4 | Sample 5 | Sample 6 | Sample 7 | Sample 8 | Sample 9 | Sample 10 |
|---|---|---|---|---|---|---|---|---|
| modulus (psi × 0.001), (MD/TD) | 0.5 | 114/136 | 96/113 | 97/119 | 64/113 | 90/99 | 98/102 | 88/95 |
| Elmendorf Tear (g). (MD/TD) | 1.0 | 17/180 | 17/260 | 16/383 | 18/320 | 136/520 | 50/184 | 53/440 |
| | 0.5 | 6/47 | 6/41 | 6/67 | 5/80 | 12/24 | 15/68 | 10/98 |
| TD/MD tear balance | 1.0 | 10.59 | 15.29 | 23.94 | 17.78 | 3.82 | 3.68 | 8.3 |
| | 0.5 | 7.83 | 6.83 | 11.17 | 16 | 2.0 | 4.53 | 9..8 |
| Puncture Energy (in-lb/mil) | 1.0 | 9.94 | 10.71 | 11.03 | 11.13 | 12.44 | 13.02 | 47.1 |
| | 0.5 | 12.93 | 12.33 | 10.63 | 12.33 | 14.72 | NA | 12.48 |

What is claimed is:

1. A high density multimodal polyethylene composition, that has a density of 0.935 g/cc or more, and that includes a blend of a first polyethylene component and a second polyethylene component, in which:

the first polyethylene component includes a bimodal polyethylene wherein the first polyethylene component includes a bimodal polyethylene that includes a high molecular weight component and a lower molecular weight component, the bimodal polyethylene being made from a polymerization conducted in the presence of a dual catalyst system that includes metallocene; and the second polyethylene component includes a unimodal polyethylene that is made from a polymerization conducted in the presence of a metallocene having two cyclopentadienyl rings, wherein the second polyethylene component is different from the first polyethylene component; wherein the unimodal polyethylene occupies less than 15 wt % of the composition, wherein the FI of the composition is 4 to 20 as determined according to ASTM-1238 Condition E, 2.16 Kg at 190° C., and wherein the Elmendorf Tear ratio (TD/MD) of the composition is 10 or less, based on a 1.0 mil film made from the composition.

2. The composition of claim 1, wherein the first polyethylene component includes a bimodal polyethylene that includes a high molecular weight component and a lower molecular weight component the bimodal polyethylene being made from a polymerization conducted in the presence of a catalyst system that includes HN3, bis(2-(trixmethylphenylamido)ethyl)amine zirconium dibenzyl and P-metallocene catalyst bis(n-propyl Cp) zirconium dichloride or difluoride.

3. The composition of claim 1 wherein a 1 mil film produced from the high density multimodal polyethylene composition has an Elmendorf Tear ratio TD/MD of less than about 8.

4. The composition of claim 1 in which the unimodal polyethylene occupies less than 10 wt % of the composition.

5. The composition of claim 1 in which the Elmendorf Tear ratio (TD/MD) of the composition is less than 5, based on a 1.0 mil film made from the composition.

6. The composition of claim 1 in which the Elmendorf Tear ratio (TD/MD) of the composition is less than 8, based on a 0.5 mil film made from the composition.

* * * * *